Figure 1A:
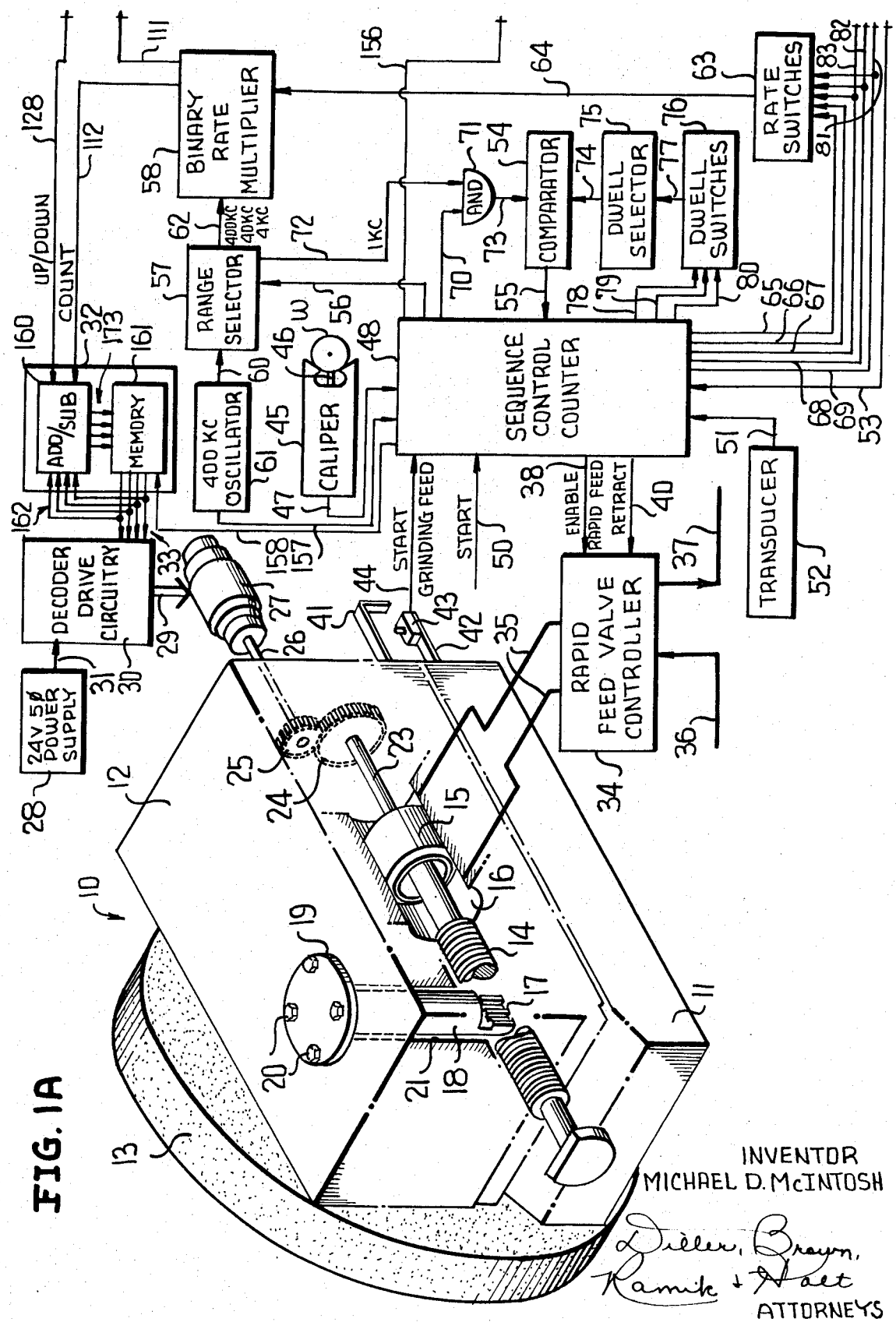

United States Patent
McIntosh

[15] 3,691,357
[45] Sept. 12, 1972

[54] POSITIONING CONTROL SYSTEM HAVING MEMORY FOR A MACHINE TOOL

[72] Inventor: Michael D. McIntosh, Greencastle, Pa.

[73] Assignee: Litton Industries, Inc., Beverly Hills, Calif.

[22] Filed: Sept. 21, 1970

[21] Appl. No.: 73,739

[52] U.S. Cl. ..........235/151.11, 51/165.71, 318/571, 318/603
[51] Int. Cl. ..............................................G06f 15/46
[58] Field of Search.........235/151.1, 151.11, 92 MC; 318/563, 569, 571, 594, 601, 603; 340/173.2, 174 PM; 51/165.71, 165.74, 165 TP

[56] References Cited

UNITED STATES PATENTS

| | | |
|---|---|---|
| 3,466,515 | 9/1969 | Madsen et al. ............318/603 |
| 3,214,573 | 10/1965 | Anderson et al. ....235/92 MC |
| 3,482,357 | 12/1969 | Seiuemon Inaba et al. ......................51/165 R X |
| 3,539,896 | 11/1970 | Reuteler et al. ............318/571 |
| 3,056,240 | 10/1962 | Morgan, Jr. et al....51/165 TP |
| 3,303,332 | 2/1967 | Götz......................235/151.11 |
| 3,466,618 | 9/1969 | Bartlett et al...........340/173.2 |

OTHER PUBLICATIONS

" New Ferroelectric Memory has Nondestructive Readout Control Engineering, February 1970, P. 80

Primary Examiner—Malcolm A. Morrison
Assistant Examiner—Jerry Smith
Attorney—Diller, Brown, Ramik & Holt

[57] ABSTRACT

A feed positioning control system having a non-volatile memory for a machine tool is described which utilizes an electro-hydraulic pulse motor to move a grinding wheel support predetermined distances during a grinding operation. A control counter is arranged, via rate selecting switches to select pulses of various predetermined pulse repetition rates for controlling the rates at which the electro-hydraulic pulse motor moves during a grinding operation. End point selecting switches and comparators are provided for determining the distance moved by the support during a grinding operation to signal the control counter to change rates or to select a dwell period. Dwell selecting switches, responsive to the control counter, are provided to establish the duration of dwell periods between application of selected rates and to signal the control counter at the end of each dwell period, including a spark out period at the end of a grinding operation. The comparators are connected to pulse counting devices, which are responsive to the pulse input to the electro-hydraulic pulse motor. The pulse counting devices comprise five binary coded decimal up/down counters each having four-bit output. Each counter contains a distinct non-volatile memory device, each of which has four magnetic core storage elements, one for each bit. The system includes means for retrieving the data stored in the memory elements prior to shut will re-establish the output of the updown counters to the same point, subsequent to the power failure.

20 Claims, 3 Drawing Figures

United States Patent
McIntosh
[15] 3,691,357
[45] Sept. 12, 1972
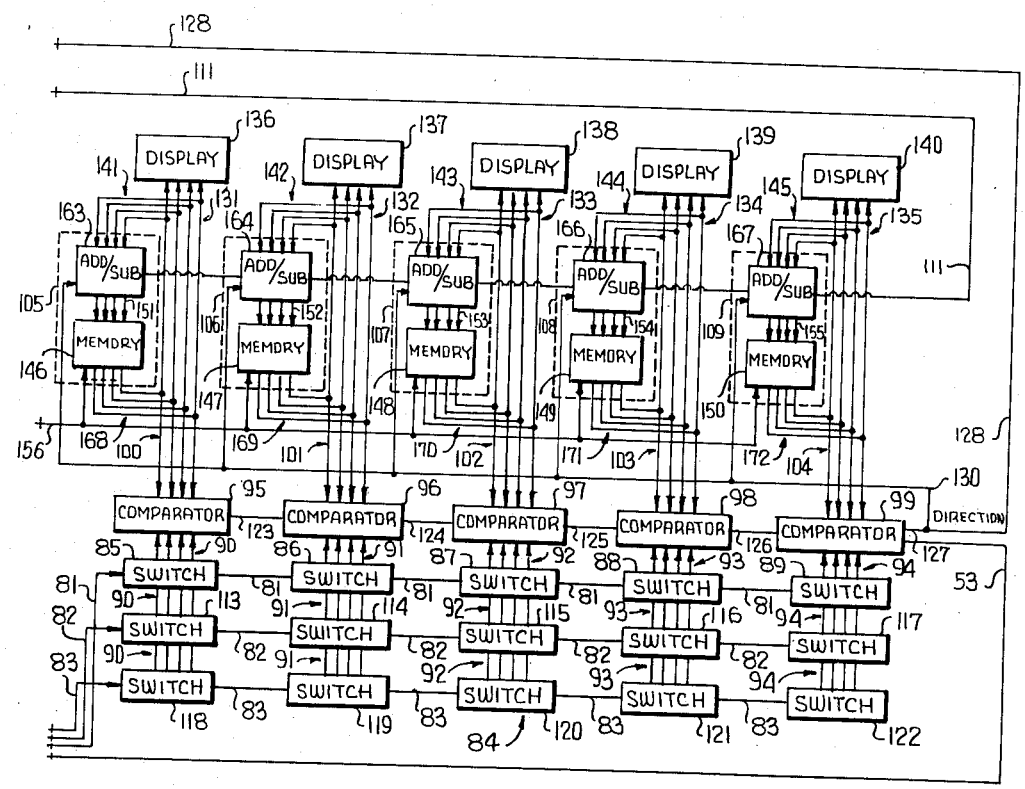

INVENTOR
MICHAEL D. McINTOSH

ATTORNEYS

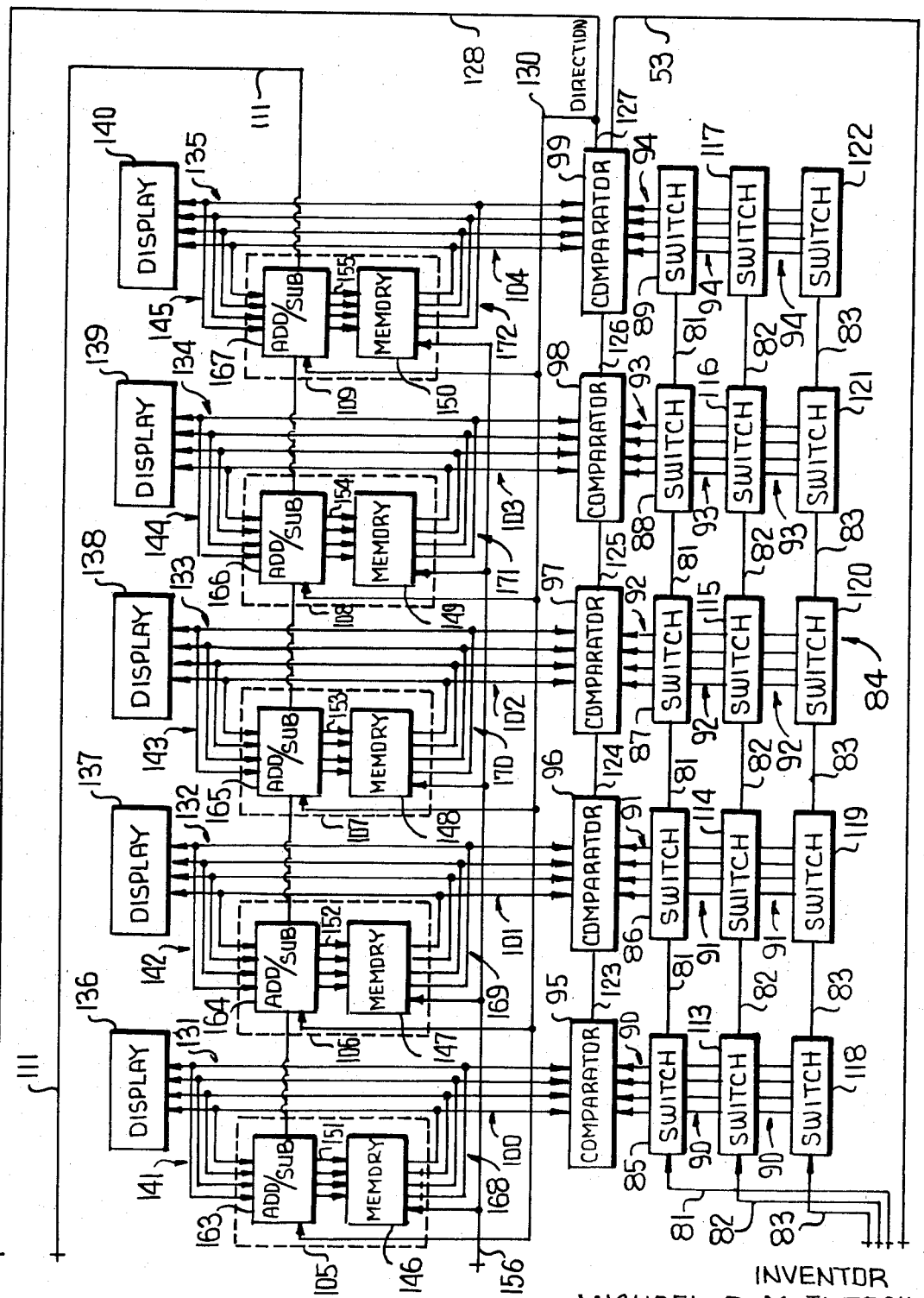

POSITIONING CONTROL SYSTEM HAVING MEMORY FOR A MACHINE TOOL

This invention relates in general to new and useful improvements in a positioning control system for providing positioning signals for a machine tool element. In particular, the invention relates to a control system which utilizes an electro-hydraulic pulse motor to move a machine element in accordance with a predetermined programmed cycle of operation, and includes counting devices for counting pulses supplied to the electro-hydraulic pulse motor. The counting devices are provided with non-volatile memory means for storing the count of the counting devices in the event of a power failure or power shut-off.

In accordance with a prior proposal, a control system was provided for controlling the feed rate and position of a machine tool element; e.g., a grinding wheel support of a grinding machine. In the system, the machine tool element could be advanced, by an electro-hydraulic pulse motor, at a variable feed rate and for predetermined distances during a cycle of operation for grinding a workpiece diameter automatically. The apparatus for actuating the machine tool element through a predetermined cycle of operation, included an input means for the electro-hydraulic pulse motor which comprised means for providing pulses of different repetition rates, and means for selectively applying pulses of one or more of the different repetition rates to the electro-hydraulic pulse motor. The input means was effective for selectively applying a given number of the pulses of the selected different repetition rates or rate to the electro-hydraulic pulse motor whereby the machine element could be moved a predetermined distance depending on the number of pulses applied to the pulse motor.

Prior to the present invention, a power failure or power shut-off destroyed all memory of the previous function of the programmed cycle of operation. Continued operation was precluded unless the system was manually reset and the machine manually returned to the identical position, which could be determined by a recorder or the like, to re-establish the operative conditions which existed at the time of the power failure or power shut-off. It was also possible, to return the electro-hydraulic pulse motor and the control system to their initial position and condition, respectively, and repeat the already accomplished portions of a cycle of operation.

It can be appreciated that the two possibilities mentioned above were time consuming and could lead to possible operator error.

In accordance with the foregoing, it is an object of this invention in a machine tool to provide a non-volatile memory of a machine function during periods of power failure or power shut-off.

It is another object of this invention in a machine tool to provide a non-volatile memory means forming part of a means for counting pulses which are used by a pulse responsive means for moving a machine element so that signals representative of the amount of movement of the machine element will be stored during periods of power failure or power shut-off.

It is a further object of this invention in a machine tool to provide a grinding machine, having a workpiece support and a grinding wheel support, with a non-volatile memory means forming part of a means for counting pulses which are fed to a pulse motor which moves the grinding wheel support so that signals representative of the amount of relative movement between the means for supporting a workpiece and the grinding wheel support will be stored during periods of power failure or power shut-off.

It is still a further object of this invention in a machine tool to provide a means for counting pulses including a non-volatile memory means which are coupled to means for adding and subtracting pulses so that the means for counting pulses may retain its count during periods of power failure or power shut-off enabling the machine tool to resume its function during a cycle of operation after interruption.

It is still another object of this invention in a machine tool to provide means for returning a means responsive to an input for providing a machine function by using a signal, stored in a non-volatile memory means, representative of the extent of the machine function already accomplished prior to periods of power failure or power shut-off.

It is still a further object of this invention to provide a memory circuit which includes non-volatile memory means coupled to adder-subtractor means so that signals may be stored during periods of power failure or power shut-off.

With the above and other objects in view, as will hereinafter appear, the nature and features of the invention will be more clearly understood by reference to the detailed description, the appended claims and the illustrations in the accompanying drawings in which like reference numerals denote like parts.

IN THE DRAWINGS

Figure 2:
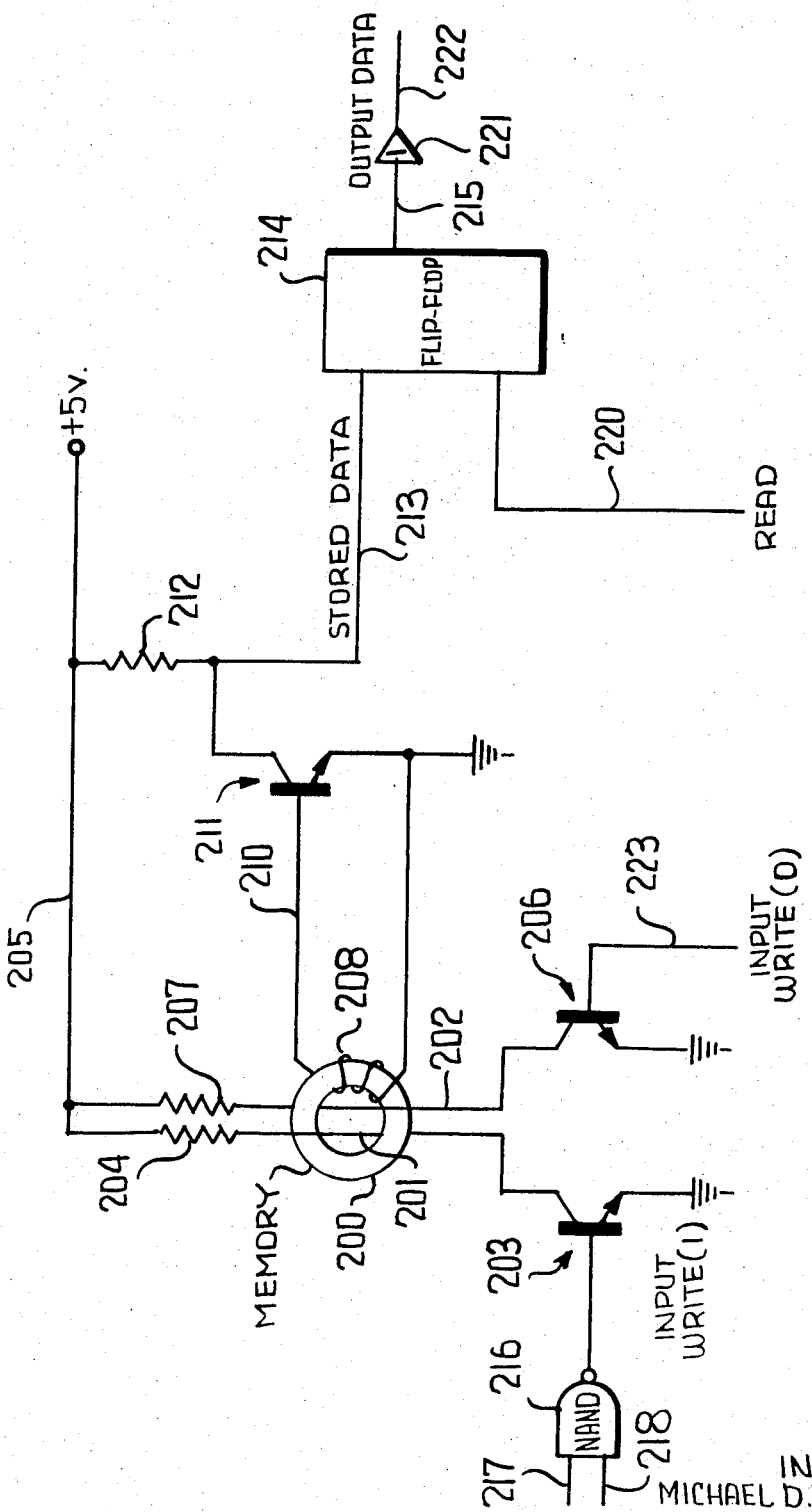

FIG. 1A and FIG. 1B is a perspective view of a feed mechanism for a grinding wheel support there being schematically illustrated a rapid feed valve controller, an electro-hydraulic pulse motor, and a positioning control system for a machine tool incorporating the present invention; and FIG. 2 is a schematic diagram of a non-volatile memory circuit which may be utilized in the invention.

Referring now the drawings in detail, it will be seen that there is illustrated in FIGS. 1A and 1B, a grinding machine which is generally referred to by the numeral 10. The grinding machine 10, as illustrated in FIG. 1A, is of conventional construction and includes a bed 11. The bed 11 has mounted thereon, in a conventional manner for longitudinal sliding movement, a work carriage or support (not shown) which is provided at opposite ends with a conventional type headstock (not illustrated) and tailstock (not illustrated). A workpiece W may be mounted between the headstock and tailstock for rotation about a predetermined axis and for longitudinal shifting with the work carriage or support (not shown).

A grinding wheel support 12 is slidably mounted on the bed 11 for controlled transverse movement with respect to the work support (not illustrated) in a conventional manner. A grinding wheel 13 is carried by the grinding wheel support 12 for rotation. The grinding wheel 13 is driven by means of an electric motor (not illustrated).

The grinding wheel support 12 is fixed longitudinally of the bed 11, but is shiftable transversely of the bed 11 both for the purpose of grinding different dimensions on the workpiece W and to compensate for variations in the diameter of the grinding wheel 13. With the grinding wheel 13 in a retracted position, the workpiece W will be positioned longitudinally of the bed 11 with one of the portions thereof in alignment with the grinding wheel 13.

After the workpiece W has been properly positioned in alignment with the grinding wheel 13, the grinding wheel 13 is advanced towards the workpiece W when the grinding operation is performed. In the past, automatic feed mechanisms for the grinding wheel support 12 were used to effect the repeated grinding of workpiece portions to a selected diameter. It has been proposed to provide a control system to effect the actuation of a feed mechanism which advances the grinding wheel 13 relative to the workpiece W for predetermined distances at preselected rates so that each diameter of the workpiece W would be accurately ground after an initial setting of the machine and control system.

The feed mechanism for advancing and retracting the wheel support 12 during a grinding operation includes a feed screw 14 which is slidably mounted in the bed 11. The feed screw 14 carries a piston 15 which is mounted within a cylinder 16 to effect rapid advancing and retracting movements of the feed screw 14.

The feed screw 14 is in threaded engagement with a member 17 formed on the lower end of a vertical anchor shaft 18. The vertical anchor shaft 18 is provided with an upper flange 19 which is secured to the wheel support 12 by bolts 20. The vertical anchor shaft 18 extends through a vertical cavity 21 formed in the wheel support 12.

The feed screw 14 is connected by a shaft 23 to a gear 24. The gear 24 is meshed with a second gear 25 which has a shaft 26 connected thereto for coupling the gear 25 to a pulse emitting means such as an electro-hydraulic pulse motor 27.

The electro-hydraulic pulse motor 27 is energized, by a wiring 29, from a decoder drive circuitry 30. The decoder drive circuitry 30 receives its power input from a 24-volt, five-phase power supply 28 via a wiring 31. A binary coded decimal up/down counter 32 controls the input to the decoder drive circuitry 30 via a wiring 33.

A rapid feed valve controller 34 is provided for selectively moving the piston 15 within the cylinder 16. The cylinder 16 is connected to the rapid feed valve controller 34 by a pair of hydraulic fluid conduits 35. The rapid feed valve controller 34 is provided with a hydraulic fluid input conduit 36 and a hydraulic fluid output conduit 37 which are connected to a suitable pump (not illustrated) in a conventional manner. The rapid feed valve controller 34 is provided with an enable rapid feed input lead 38 on which there appears a signal to begin a grinding operation. The rapid feed valve controller 34 is also provided with an input lead 40 suitable for receiving a retract signal indicating that a grinding operation has been completed.

The grinding wheel support 12 is provided with a bracket 41 which is movable with the wheel support 12. The bed 11 is provided with a bracket 42 positioned near the bracket 41. A switch, generally indicated by the numeral 43, is carried by the bracket 42. The switch 43 is provided with an output lead 44 on which appears a start grinding feed signal whenever the bracket 41 trips the switch 43 during initial rapid feed performed by the feed piston 15.

The electro-hydraulic pulse motor 27 may, in a practical embodiment, consist of an Icon Model 1–SSS motor. This particular Icon electro-hydraulic pulse motor is designed so that it rotates 1 revolution for each 240 pulses applied to its input. The gearing of the motor is arranged so that each pulse applied to the pulse motor 27, in the aforementioned practical embodiment, is effective to advance the grinding wheel support 12 in fine increments, such as 0.000050 of an inch.

The control system includes a caliper 45 which is arranged to sense the diameter of the workpiece W. The caliper 45 includes a probe 46 which is connected to the core of a transducer (not illustrated). The probe 46, as illustrated, is held in engagement with the workpiece W by means of a spring (not shown) during particular portions of a cycle of operation. Details of a suitable caliper are shown in FIG. 1 of U.S. Pat. No. 3,157,971, granted Nov. 24, 1964.

The output of the caliper 45 is coupled, via a lead 47, to a sequence control counter 48.

The sequence control counter 48 is provided with a number of additional input means for supplying control signals thereto. A lead 50 is connected to the sequence control counter 48 to supply a signal from a manually operated switch (not illustrated) for providing an initial start signal to the sequence control counter 48. As another input, the output lead 44 from the switch 43 is connected to the sequence control counter 48 to provide a start grinding feed signal to advance the sequence control counter 48 at the end of a rapid feed period upon the closing of the switch 43 by the bracket 41. A lead 51 is connected to the sequence control counter 48 for receiving a signal from a transducer 52 which is arranged to sense an increase in the current input to the electric motor (not illustrated) which rotates the grinding wheel 13 when its forward facing grinding surface first contacts the workpiece W. Additional counter advance signal data is provided from a wiring 53 as will be made clear in more detail below. The sequence control counter 48 is provided with an input from a comparator 54, via a lead 55, for signalling the sequence control counter 48 of the expiration of predetermined dwell periods. Additionally, the sequence control counter 48 is provided with an input wiring 157 for receiving an input from an 400KC oscillator 61.

The sequence control counter 48 is provided with a number of outputs. An output is provided through the lead 38 which is connected from the sequence control counter 48, for providing an enable signal to the rapid feed valve controller 34 to initiate a rapid feed of the grinding wheel 13 towards the workpiece W before any grinding takes place. Within the sequence control counter 48 are logic means (not illustrated) and clock pulse forming circuits (not illustrated) responsive to the input provided from the wiring 157 for providing identical clock pulse outputs to a wiring 156 and a wiring 158. The sequence control counter 48 also provides an output signal to the lead 40 for supplying a retract signal to the rapid feed valve controller 34 upon the completion of a cycle of operation. The sequence control counter 48 is provided with an output wiring 56 on which may appear range selecting signals which are applied to a range selector 57 which, with a binary rate multiplier 58 form a rate generator.

The range selector 57 is coupled, via a lead 60, to an output from the 400KC crystal controlled oscillator 61.

The output from the range selector 57, depending on the signal provided from the wiring 56, appears on a lead 62 as a train of pulses having one or another of different repetition rates illustrated as 400KC, 40KC or 4KC. The lead 62 is connected to a first input of the binary rate multiplier 58 which receives, as its other input, binary coded decimal signals from rate switches indicated generally by the numeral 63 via a wiring 64.

The specific constituents suitable for use in forming the range selector 57, the binary rate multiplier 58 and the rate switches 63 which may be used in the present invention are fully described in commonly assigned application, Ser. No. 45,829, filed June 12, 1970 in the names of Ralph E. Price and Stanley C. Schoonover.

The sequence control counter 48 is provided with five output leads 65–69 on which appear selective enable signals for application to the rate switches 63 for establishing various feed rates during a cycle of operation.

The sequence control counter 48 is also provided with an output wiring 70 which is coupled as a first input to an AND circuit 71. The AND circuit 71 is provided with a second input from a lead 72 supplied from the range selector 57 and illustrated as being a pulse train having a 1KC repetition rate. The output from the AND circuit 71 appears on a lead 73 thereby providing a first input to the comparator 54. A second input to the comparator 54 is provided from a wiring 74 which, in turn, is coupled to receive outputs from a dwell selector 75. The dwell selector 75 is arranged to receive signals from dwell switches 76 via a wiring 77. The dwell switches 76, as illustrated, are supplied with three inputs from the sequence control counter 48 by means of three leads 78, 79 and 80 on which may appear individual dwell enable signals.

The leads 69, 68 and 67 from the sequence control counter 48, in addition to being connected to the rate switches 63, are connected respectively to wirings 81, 82 and 83. The wirings 81, 82 and 83 are, in turn, connected to selected switches of a bank of end point selecting switches indicated generally by the numeral 84.

The wiring 81 is arranged to supply to end point switches 85–89 side wall feed enable signals from the sequence control counter 48. The end point switches 85–89 may be set by an operator to supply respectively binary coded decimal signals to wirings indicated by the numerals 90–94. As illustrated, the wiring 90 consists of four leads on each of which may appear signals indicating a high (1) condition. A side wall feed enable signal which appears on the wiring 81 may be passed to the selected ones of the four leads which comprise the wiring 90 depending on the condition of individual contacts (not illustrated) within the end point switch 85. Some of the contacts (not illustrated) within the end point switch 85 may be set to establish a low (0) condition by placing a reference level on selected ones of the four leads forming the wiring 90. Similarly, side wall feed enable signals may be passed to selected ones of the leads which comprise the wirings 91–94 and the reference level established on others of the leads depending on the particular settings of individual contacts (not illustrated) within the switches 86–89, respectively. Thus binary coded decimal signals may appear on the wirings 90–94 whenever the sequence control counter 48 signals the beginning of a side wall feed via the lead 67 and the wiring 81.

The wirings 90–94 are respectively connected to binary comparators 95–99 for the purpose of comparing binary coded decimal signals supplied respectively via wirings 100–104 from binary coded decimal up/down counters 105–109, respectively. Each of the binary coded decimal up/down counters 105–109 include respectively a binary adder/subtractor 163–167 and a non-volatile memory device 146–150, respectively. The binary coded decimal up/down counters 105–109 are arranged to receive, via wiring 111, a count output from the binary rate multiplier 58. An output from the binary rate multiplier 58 is also connected, via a wiring 112, to an input of the binary coded decimal up/down counter 32 so as to supply a count input thereto corresponding to the count appearing on the wiring 111 except when it is desired to add compensation pulses which drive the electro-hydraulic pulse motor 27 without advancing the up/down counters 105–109. This is accomplished by logic circuit means (not illustrated) which prevent an output from the binary rate multiplier 58 from appearing on the wiring 111, while allowing an output to appear on wiring 112. Thus, the comparators 95–99 are operatively arranged to compare binary coded decimal signals from the end point switches 85–89, which indicate a desired position for the advancing grinding wheel support 12, and the number of effective pulses which are supplied from the binary rate multiplier 58, as a binary coded decimal signal indicative of the instantaneous position of the grinding wheel support 12 as it is being advanced during a side wall feed enable portion cycle. This is effected when an output from the binary rate multiplier 58 is applied to the binary coded decimal up/down counter 32 which, in turn, is coupled via the wiring 33 to the decoder drive circuitry 30 which is supplied with the five-phase, 24-volt power supply 28, via the wiring 31. The decoder drive circuitry 30 supplies power, under the control of the binary coded decimal up/down counter 32, to the electro-hydraulic pulse motor 27 via the wiring 29.

The binary coded decimal up/down counter 32 is constructed similarly to each of the up/down counters 105–109 and includes a binary adder/subtractor 160 having an input thereto supplied from a non-volatile memory device 161 via wiring 162. The adder/subtractor 160, in turn, has its output coupled, via a wiring 173, to the non-volatile memory device 161.

The output leads 68 and 67 on which may appear respectively fast approach signals and No. 1 feed enable signals from the sequence control counter 48, are coupled respectively to the wirings 82 and 83. The wiring 82 is connected to end point switches 113–117 which, in turn, are coupled respectively, to the wirings 90–94. As can be readily appreciated from the foregoing discussion relating to the end point switches 85–89, the end point switches 113–117 may be similarly set by an operator so that selected contacts (not illustrated) within each of the switches 113–117 are effective to supply high (1) or low (0) signals to individual leads of the wirings 90–94 so as to supply the comparators 95–99 with binary coded decimal signals upon the occurrence of a fast approach rate enable signal on the wiring 82 from the lead 68.

The wiring 83 is arranged to couple the No. 1 feed enable signals which may appear on the lead 67 to yet another set of end point switches designated by the numerals 118–122 which, like the other end point switches, may be set by an operator to supply binary coded decimal signals on the wirings 90–94 upon the occurrence of a No. 1 feed rate enable signal from the sequence control counter 48 supplied over the lead 67 and the wiring 83.

In operation, the binary comparator 95 operates to compare a particular binary coded decimal signal supplied from contacts within either end point switch 85, 113 or 118 depending on which, if any, of the enable signals appear on the wirings 81, 82 and 83, respectively, with a binary coded decimal signal from the binary coded decimal up/down counter 105 appearing on the wiring 100. Similarly, the binary comparators 96–99 compare binary coded decimal signals which may appear respectively on the wirings 91–94 with those which appear on the wirings 100–104, respectively. Each of the comparators 95–98 is coupled respectively to the next succeeding comparator via output leads 123–126. As each of the comparators 95–98 detects a match between the signals applied thereto, an enable signal appears on its respective output lead 123–126 which places the next succeeding comparator into operation. Each of the comparators 95–99 is concerned with one significant digit, and the last comparator 99 is concerned with the least-significant digit.

The comparator 99 is provided with a wiring 53 which supplies a signal for advancing the sequence control counter 48 whenever the final comparator 99 signals a match between the two binary coded decimal numerals applied thereto.

An output from the comparator 99 is directed via a wiring 127 and a wiring 128 to the up/down input of the binary coded decimal up/down counter 32 in order to halt driving of the electro-hydraulic pulse motor 27 and, to reverse the direction of the binary coded decimal up/down counter 32 and thus the direction of the electro-hydraulic pulse motor 27 at the end of a grinding sequence so as to cause the retraction of the grinding wheel 13. The output from the final comparator 99 is similarly directed to the binary coded decimal up/down counters 105–109 via the wiring 127 and a wiring 130.

A more detailed description of a comparator system suitable for use in the present invention, and which includes five comparators is fully disclosed and illustrated in FIG. 4 of the commonly assigned application, Ser. No. 45,826, filed June 12, 1970 in the names of Ralph E. Price and Stanley C. Schoonover.

Each of the binary coded decimal up/down counters 105–109 is coupled respectively, via wirings 168–172 and wirings 131–135 to display members 136–140, respectively. The display members 136–140 are operatively arranged to decode binary coded decimal signals which appear on the wirings 131–135 from the respective binary coded decimal up/down counters 105–109 and preferably provide a visual indication, in decimal numerals, indicative of the instant diameter of the workpiece W as it is undergoing grinding.

Each of the binary adder/subtractors 163–167 functions within the up/down counters 105–109 as a device which performs the addition or subtraction of incoming count pulses supplied from the wiring 111 and data stored respectively within the non-volatile memory devices 146–150. Whether the data within the non-volatile memory devices 146–150 is added or subtracted, depends on the sense of the directional signal which appears on the wiring 130, this sense being generated by the comparators 95–99. Each of the non-volatile memory devices 146–150 is capable of storing four binary bits, and is effective to store the four binary bits during periods of power failure or power shut-off. Each of the non-volatile memory devices 146–150 is coupled respectively by a wiring 151–155 to the output from each of the adder/subtractors 163–167, respectively, for the purpose of obtaining an input representative of the instantaneous machine condition, which is stored indefinitely in the non-volatile memory devices 146–150, during periods of power failure or power shut-off.

Each of the non-volatile memory devices 146–150 is connected to the wiring 156 for the purpose of receiving therefrom clock pulses effective to transfer stored binary bits from the non-volatile memory devices 146–150 to the adder/subtractors 163–167, respectively, the display members 136–140, respectively, and comparators 95–99, respectively. As illustrated, the wiring 156 is connected to the sequence control counter 48 for the purpose of receiving the clock pulses therefrom. The clock pulses, which appear on the wiring 156, occur at the system sequence time.

Each of the non-volatile memory devices 146–150 will retain indefinitely the data stored therein during a power failure or power shut-off. The stored data is an exact representation of the point to which the wheel support 12 had advanced prior to the power interruption. The non-volatile memory devices 146–150 are clocked by the clock pulses from the wiring 156 which originates from the sequence control counter 48, such that for each set of clock pulses, occurring at the system sequence time, each of the non-volatile memory devices 146–150 shall operatively provide the next sequential set of binary coded decimal pulses as an output of the respective up/down counters 105–109, as described above. These binary coded decimal pulses are also directed to the binary comparators 95–99 to enable a comparison of the current location with the desired end point position, and to the display member 136–140 to provide an indication of current machine location.

Referring to FIG. 1A, the up/down counter 32 is updated by the incoming clock pulses on wiring 158, which causes the adder/subtractor 160 to perform the addition or subtraction of the data stored in the non-volatile memory device 161, and the incoming count pulses appearing on wiring 112 from the binary rate multiplier 58, in accordance with the sense of the up/down signal on the wiring 128 from the comparators 95–99. Thus, the non-volatile memory device 161 operatively provides the next sequential set of binary coded decimal pulses as the output from the binary coded decimal up/down counter 32 to the decoder drive circuitry 30. The decoder drive circuitry 30, in turn, drives the electro-hydraulic pulse motor 27.

Subsequent to a period of power failure or power shut-off, when power is re-applied to the system, including the non-volatile memory devices 146–150, and 161, and the sequence control counter 48, the sequence control counter 48 will automatically provide clock pulses on the wiring 156 to the non-volatile memory devices 146–150 and on the wiring 158 to the non-volatile memory device 161, thus retrieving the data stored therein and causing the machine operation to initiate at the exact location which had been obtained at the time of power interruption.

The electro-hydraulic pulse motor 27, as heretofore described, is driven by pulses on the wiring 29 from the decoder drive circuitry 30, which is driven by the binary coded decimal up/down counter 32. The binary coded decimal up/down counter 32 receives clock pulses from the wiring 158 such that compensation pulses may be applied independent of clock pulses supplied to the wiring 156, therefore, the non-volatile memory device 161 within the up/down counter 32, stores the position of the wheel support 12 independent of the data stored within the non-volatile memory devices 146–150 which are clocked by pulses from the wiring 156. This arrangement allows compensating pulses to advance the electro-hydraulic pulse motor 27 without affecting the non-volatile memory devices 146–150 which are effective in the up/down counters 105–109 associated with the binary comparators 95–99, respectively. Except for any offset generated as a result of the aforesaid compensation, the clock pulses appearing on the wirings 156 and 158, are identical.

Referring now to FIG. 2, a circuit suitable for non-volatile storage of a single binary bit within a magnetic memory device is represented as being a conventional ferro-magnetic core 200. In practice, the memory device may be a micro-miniature film magnetic core or a thin-film ferro-magnetic element of the types presently being employed in modern high-speed data processing and computer memory systems. Other types of memory elements also could be utilized.

The ferro-magnetic core 200 is provided with a pair of write windings 201 and 202. The windings 201 and 202 are oppositely wound about or passed through the center of the ferro-magnetic core 200 in opposite directions, thereby providing the possibility of oppositely magnetizing the ferro-magnetic core 200 providing thereby means for effectively storing either a (1) or a (0) in the ferro-magnetic core 200. The write winding 201 is connected between the collector of a NPN transistor 203 and an end of a resistor 204 having its other end connected to a lead 205 which is connected to a source of collector voltage illustrated as plus 5 volts. The write winding 202 is connected between the collector of a second NPN transistor 206 and an end of a resistor 207 which has its other end connected to the lead 205 for supplying collector voltage to the transistor 206.

The bases of the transistors 203 and 206 are connected respectively to input leads for supplying a write (1) signal and a write (0) signal respectively. The write (1) input lead is fed via a NAND circuit 216. The NAND circuit 216 is provided with two input leads 217 and 218 which receive respectively a clock input from the sequence control counter 48 (FIG. 1A), and an output from a lead forming one of the leads of wirings 151–155 (FIG. 1B) or one of the leads forming wiring 173 (FIG. 1A).

The ferro-magnetic core 200 is provided with a sensing winding 208 which is coupled, via a point of reference potential, to a lead 210 between the base and emitter of a third NPN transistor 211.

The collector of the transistor 211 is connected to the lead 205 through a resistor 212 for supplying collector voltage to the transistor 211.

The collector of the transistor 211 is directly coupled, via a lead 213, to the data input of a flip-flop circuit generally indicated by the numeral 214.

A read input terminal of the flip-flop circuit 214 is connected to a lead 220 for the purpose of receiving clock pulses from the sequence control counter 48 (FIG. 1A).

The flip-flop circuit 214 is provided with an output data lead 215 which is coupled to an inverter circuit 221. The output from the inverter 221 appears on the lead 222.

In the event of power failure or power shut-off, the ferro-magnetic core 200 retains its magnetization, storing the data representative of the machine location at the time of power failure. Consequently, when power is restored, the first clock pulse which appears on the lead 217 causes the data stored in the magnetic core 200 to be read out, and the sensing winding 208 senses the direction of magnetization with the ferro-magnetic core 200, upon the flow of current through the winding 201. A signal is then supplied to the base of the transistor 211 which will place the transistor 211 in one or another of two signal conditions thereby establishing either a high (1) or low (0) voltage on the lead 213. Thus, the particular bit of information stored within the ferro-magnetic core 200 during periods of power failure and power shut-off, is retrieved and appears as a predetermined voltage level on the lead 213. Upon application of clock pulses from the lead 220 to the flip-flop circuit 214, the signal appearing on the lead 213 is effectively transferred to the output lead 215. The output which appears on the output lead 215 is inverted in order to provide signals of the appropriate polarity as required by the system for supplying a single bit to one of the adder/subtractors 163–167 and 160.

It will be appreciated that each of the non-volatile memory devices 146–150 (FIG. 1B) and 161 (FIG. 1A) includes four circuits corresponding to the circuit illustrated in FIG. 2. It will be appreciated that each of the four inverter circuits corresponding to the inverter circuit 221 within individual non-volatile memory devices 146–150 (FIG. 1B) and 161 (FIG. 1A) has its lead, corresponding to lead 222, connected to individual leads of the wirings 168–172 (FIG. 1B) and wiring 162 (FIG. 1A).

It will be appreciated that the leads 217, 220 and 223 are connected to the aforesaid wiring 156, which provides the clock pulses generated in the sequence control counter 48. The clock pulses which appear on the lead 220 are delayed slightly with respect to the clock pulses which appear on the lead 223 to enable the transistor 211 to obtain its proper state before the flip-flop circuit 214 is clocked. The clock pulses which appear on lead 217 occur after the data has been clocked out of the magnetic core 200, and enables new data appearing on lead 218 to be clocked into storage.

OPERATION

To place the feed mechanism and control system illustrated in FIGS. 1A and 1B in condition for operation, the rate switches 63, the dwell switches 76, and the end point switches 84 are set in accordance with the desires of an operator, and power is supplied to the control system from a power supply (not illustrated). The workpiece W. is positioned longitudinally of the bed 11 with a portion thereof to be ground spaced from and in alignment with the grinding wheel 13. An electric motor (not illustrated is energized to place the grinding wheel 13 in rotation, in a conventional manner.

With the application of power to the control system, the 400KC oscillator 61 starts to oscillate at a given frequency supplying an input to the range selector 57.

To initiate a cycle of operation, the operator places a start signal on the lead 50 which causes the sequence control counter 48 to provide an enable rapid feed signal on the lead 38. The enable rapid feed signal causes the rapid feed valve controller 34 to supply hydraulic fluid to the cylinder 16 which acts on the piston 15 to rotate the feed screw 14.

Since the feed screw 14 is in threaded engagement with the member 17 formed on the lower end of the anchor shaft 18, the grinding wheel support 12 moves rapidly advancing the grinding wheel 13 towards the workpiece W.

The grinding wheel support 12 continues to move rapidly advancing the grinding wheel 13 towards the workpiece W until the bracket 41 engages the switch 43 providing a start grinding feed signal on the lead 44.

The appearance of the start grinding feed signal on the lead 44 causes the sequence control counter 48 to advance thereby removing the enable rapid feed signal from the lead 38 and placing an enable side wall feed signal on the lead 69 which appears on the wiring 81.

The enable side wall feed signal on the lead 67 is passed via the rate switches 63 and the wiring 64 to the binary rate multiplier 58 which applies binary coded pulse signals of a predetermined rate to the wiring 112, and thence to the binary coded decimal up/down counter 32 as the count input thereto.

The binary coded decimal up/down counter 32, in turn, supplies a binary coded decimal control signal, via the wiring 33, to the decoder drive circuitry 30 which controls the application of power from the power supply 28 to the electro-hydraulic pulse motor 27, via the wiring 29.

The electro-hydraulic pulse motor 27 rotates causing the grinding wheel support 12 to advance the rotating grinding wheel 13 so that the side walls of the workpiece W are ground. An output signal from the binary rate multiplier 58 is also fed by the wiring 111 to provide a count input to the binary coded decimal up/down counters 105–109.

It will be appreciated that the signal which appears on the wiring 111 from the binary rate multiplier 58 is indicative of the number of pulses applied to the electro-hydraulic pulse motor 27 as it advances the grinding wheel 13, and that the signals from the end point switches 85–89, as set by an operator, indicates a desired advance position of the grinding wheel 13.

The grinding of the side walls of the workpiece W continues at a relatively high rate until the binary comparators 95–99 sense a match between the signals supplied from the end point switches 85–89 with those received from the binary coded decimal up/down counters 105–109, respectively. When the final binary comparator 99 senses a match in the last digit, a counter advance signal is provided from the binary comparator 99 to the wiring 53 indicating that a sufficient number of pulses have been applied to the electro-hydraulic pulse motor 27 to advance the grinding wheel 13 a particular distance determined by the setting of the end point switches 85–89. The counter advance signal which appears on the wiring 53 is applied to the sequence control counter 48, which in turn, removes the side wall feed enable signal from the lead 69 and the wiring 81 and, in turn, supplies a fast approach enable signal on the lead 68 which is passed, via the rate switches 63 and the wiring 64 to the binary rate multiplier 58 which establishes a somewhat lower rate output therefrom than the rate used during the side wall feed.

The electro-hydraulic pulse motor 27 continues to advance the grinding wheel 13 and the workpiece W continues to be ground at a particular fast approach feed rate until the transducer 52, responding to an increase in current supplied to the electric motor (not illustrated) which rotates the grinding wheel 13, provides a signal on the lead 51 indicating that the principal grinding surface of the grinding wheel 13 has contacted a major surface of the workpiece W. The signal on the lead 51 causes the sequence control counter 48 to advance removing the fast approach enable signal from the lead 68, and establishing a No. 1 feed rate enable signal to the lead 67 and the wiring 83.

It is to be appreciated, that the end point switches 113–117, while receiving an enable signal during the fast approach portion of a cycle of operation, did not function to stop the fast approach simply because the fast approach movement was interrupted by the action of the transducer 52. It will be appreciated that in the event of failure of the transducer 52 to respond properly, the end point switches 113–117 could be utilized to stop the fast approach movement or be used as an alternative to the action of the transducer 52.

The No. 1 feed enable signal from the lead 67 is coupled via the rate switches 63 and the wiring 64 to the binary rate multiplier 58 to establish a particular feed rate which is somewhat less than the feed rate utilized during the previous portions of a cycle of operation.

The No. 1 feed enable signal from the lead 67 is supplied to the end point selector switches 118–122 via the wiring 83.

The binary rate multiplier 58 supplies signals to the binary coded decimal up/down counter 32 which are of lower rate than the rate used during the fast approach, and the electro-hydraulic pulse motor 27 thus continues to rotate at this lower rate. The grinding wheel 13 continues to be advanced, now at the lower No. 1 feed rate, until the final binary comparator 99 provides a counter advance signal to the wiring 53 indicating that the electro-hydraulic pulse motor 27 has been provided with a sufficient number of pulses to advance the grinding wheel 13 a particular distance determined by the setting of the end point switches 118-122. The counter advance signal which appears on the wiring 53 is supplied to the sequence control counter 48 causing the sequence control counter 48 to advance, removing the the No. 1 feed enable signal from the lead 67. The disappearance of the enable signal from the lead 67 results in the removal of signals on the wiring 64 from the rate switches 63 thereby causing the output from the binary rate multiplier 58 to be removed from the wiring 112, causing the electro-hydraulic pulse motor 27 to stop, and from the wiring 111, causing the up/down counters 105-109 to cease counting. Simultaneously, the sequence control counter 48 establishes a first dwell enable signal on the lead 78. The first dwell enable signal on the lead 78 is fed to dwell switches 76 which, in turn, supply a signal via the wiring 77 to the dwell selector 75.

The comparator 54 receives a signal from the dwell selector 75, via the wiring 74, and a pulse signal from the range selector 57, via lead 72, AND circuit 71, and lead 73. The AND circuit 71 is enabled by an additional input from the sequence control counter 48 supplied via the output wiring 70 during the dwell period. The comparator 54 is arranged to supply a counter advance signal, via the lead 55, to the sequence control counter 48 upon the lapse of a dwell period which is established by the setting of the dwell switches 76 which are enabled by the signal appearing on the lead 78 and determined by the number of pulses effectively supplied to the comparator 54 from the range selector 57 via the AND circuit 71.

During the first dwell period, prior to the appearance of a counter advance signal from the comparator 54, the caliper 45 is moved into position, by conventional means (not illustrated) so that the probe 46 is in contact with the workpiece W. Also during the first dwell period, conventional steady rests (not illustrated) are moved into position about the workpiece W by conventional means (not illustrated).

Upon the occurrence of the counter advance signal on the lead 55 from the comparator 54, the sequence control counter 48 again advances, removing the first dwell enable signal from the lead 78 and the signal from the wiring 70, establishing a No. 2 feed enable signal on the lead 66.

The No. 2 feed enable signal appearing on the lead 66 is passed via rate switches 63 and the wiring 64 to the binary rate multiplier 58 enabling the binary rate multiplier 58 to provide a rate signal to the binary coded decimal up/down counter 32 which is somewhat less than the rate signal utilized during the existence of the No. 1 feed rate enable signal.

The electro-hydraulic pulse motor 27 is again energized to advance the grinding wheel 13 against the workpiece W at a rate somewhat less than the rate of advance established during the existence of the No. 1 feed rate enable signal.

The grinding wheel 13 continues to advance against the workpiece W until the caliper 45 senses that a portion of the workpiece W being ground has reached a predetermined diameter placing a signal on the lead 51 which causes the sequence control counter 48 to advance, removing the No. 2 feed rate enable signal from the lead 66 and causes the output signal from the binary rate multiplier 58 to disappear from the wiring 112, halting the rotation of the electro-hydraulic pulse motor 27 and the advance of the grinding wheel 13. Simultaneously, a second dwell enable signal is supplied from the sequence control counter 48 to the dwell switches 76, via the lead 79. The comparator 54 receives signals from the dwell selector 75 and the AND circuit 71, which has been enabled by a signal from the sequence control counter 48 appearing on the wiring 70. The grinding wheel 13 continues to rotate, but not advance, thereby rounding out the already ground portion of the workpiece W. As before, the comparator 54 provides a counter advance signal, via the lead 55, to the sequence control counter 48 upon the lapse of a second dwell period which is established by the setting of the dwell switches 76 and determined by the number of pulses effectively supplied to the comparator 54 from the range selector 57.

Upon receipt of the counter advance signal from the comparator 54 at the end of the second dwell period, the sequence control counter 48 advances, removing the second dwell enable signal from the lead 79 and the signal from the wiring 70. Additionally, the sequence control counter 48 provides a fine feed rate enable signal on the lead 65, which signal is coupled, via the rate switches 63 and the wiring 64 to the binary rate multiplier 58. The binary rate multiplier 58 again is activated and establishes a signal on the wiring 112 having a rate somewhat less than the rate utilized during the No. 2 rate portion of the operating cycle.

The electro-hydraulic pulse motor 27 resumes operation and continues to advance the grinding wheel 13 until the caliper 45 signals that the final diameter of the workpiece W being ground has been reached.

The sequence control counter 48, upon receipt of a signal from the caliper 45, via the lead 47, indicating that the final diameter of the portion of the workpiece W being ground has been reached, removes the fine feed rate enable signal from the lead 65. The binary rate multiplier 58 ceases to provide a signal to the wiring 112, thereby removing the input to the binary coded decimal up/down counter 32. The electrohydraulic pulse motor 27 stops, and the grinding wheel 13 ceases to advance against the workpiece W. The sequence control counter 48 concurrently establishes a third dwell enable signal on the lead 80 and thence to the dwell switches 76.

The comparator 54 receives a signal from the dwell selector 75 via the wiring 74 and, as before, from the AND circuit 71 which has been provided with an enable signal from the wiring 70. The grinding wheel 13 continues to rotate, but not advance, so as to remove any remaining small irregularities which may remain on the ground surface of the workpiece W during the third dwell period, known as a spark out time.

The comparator 54 again provides a counter advance signal to the sequence control counter 48 via the lead 55 upon the lapse of a third dwell period (spark out time) causing the sequence control counter 48 to advance again thereby removing the third dwell enable signal from the lead 80 and the signal from the wiring 70.

Upon the advance of the sequence control counter 48 in response to the last-mentioned signal from the comparator 54 indicating the end of the third dwell period, the sequence control counter 48 responds to a signal on the lead 47 from the caliper 45 which now senses the final dimension of the portion of the workpiece W being ground. If the signal received from the caliper 45 indicates, as expected, that the diameter is correct, the sequence control counter 48 again advances, establishing a retract signal on the lead 40. If the signal received from the caliper 45 indicates that the diameter is over-size, the fine feed rate enable signal is again established and grinding continues until the caliper 45 signals that the correct diameter has been obtained. The spark out dwell sequence is again established, and the sequence control counter 48 again advances at the end of the spark out dwell period. Once again, the caliper 45 provides an output on the lead 47 indicative of the final diameter of the ground portion of the workpiece W, and the sequence control counter 48 establishes a retract signal on the lead 40.

The appearance of the retract signal on the lead 40, causes the rapid feed valve controller 34 to supply fluid to the cylinder 16 so as to drive the piston 15 in an opposite direction to its original direction thereby rapidly moving the grinding wheel support 12, and, thus, the grinding wheel 13 away from the workpiece W.

The grinding wheel support 12 continues to retract until a predetermined position is reached. A limit switch (not illustrated), carried by the bed 11 is actuated by a finger or bracket (not illustrated) carried by the grinding wheel support 12 to provide a signal at the completion of the retracting movement of the grinding wheel support 12 in a conventional manner.

It will be understood that the grinding wheel support 12 may again be advanced towards the workpiece W by a rapid feed movement provided by the piston 15 upon subsequent enabling of the rapid feed valve controller 34 by a signal on the lead 38 and the entire grinding sequence repeated.

In a practical embodiment, it will be appreciated that the wheel support 12 may be reset a given distance as determined by the total feed end point switches 118-122 after final size has been reached and signals from the binary rate multiplier 58 supplied to the binary coded decimal up/down counter 32 which receives a down count signal from the wiring 128 from the last binary comparator 99 upon the completion of the grinding, dwell and spark out portions of the cycle of operation.

During the side wall, fast approach and No. 1 feed portions of a cycle of operation, the sequence control counter 48 supplies a signal to the range selector 57 via output wiring 56 which establishes a basic frequency of 400KC on the lead 62 for application to the binary rate multiplier 58. During the No. 2 feed rate portion of a cycle of operation, the sequence control counter 48 supplies a signal to the range selector 57, via the wiring 56, to establish a 40KC signal on the lead 62. Similarly, during the fine feed rate portion of a cycle of operation, a 4KC signal is established on the lead 62 from the range selector 57 in response to a signal from the wiring 56.

During those portions of a cycle of operation described above in which the binary rate multiplier 58 supplies a count input to the binary coded decimal up/down counter 32, the electro-hydraulic pulse motor 27 is caused to advance or retract the grinding wheel support 12 a given distance for each pulse effectively supplied to the electro-hydraulic pulse motor 27.

Since the identical count which is provided to the binary coded decimal up/down counter 32 from the binary rate multiplier 58 is also provided as the count input to the binary coded decimal up/down counters 105-109, it will be appreciated that the visual display members 136-140 can be arranged to display in decimal numerals the dimension of the workpiece W during a grinding cycle of operation, and the relative position of the grinding wheel support 12 and thus the grinding wheel 13 with respect to the center of the workpiece W.

As thus far described, it will be appreciated that in the event of power failure or power shut-off during a cycle of operation, the counts stored in the binary coded decimal up/down counters 105-109 and 32, would ordinarily be lost. In accordance with the invention, however, the instantaneous binary coded decimal output from each of the binary coded decimal up/down counters 105-109 and 32, is continually stored in the non-volatile memory devices 146-150 and 161, which are part of said up/down counters 105-109 and 32, respectively. Each of the non-volatile memory devices 146-150 and 161 are effective to retain in storage four binary bits during periods of power failure or power shut-off, representative of the work position at that instant. Thus, the condition of each of the binary coded decimal up/down counters 105-109 and 32 may be stored indefinitely during the periods of power failure or power shut-off.

Upon the re-application of power to the control system including the sequence control counter 48, the first clock pulses provided by the sequence control counter 48 on the wiring 156 and the wiring 158, are effective to retrieve the binary coded bits stored within the non-volatile memory devices 146-150 and 161 within the binary coded decimal up/down counters 105-109 and 32, so as to automatically re-start the machine operation at the same position which was obtained just prior to power failure or power shut-off. Thus, the binary coded decimal up/down counters 105-109 and 32 may be reset subsequent to a period of power failure or power shut-off thereby providing proper output signals to the visual display devices 136-140, the binary comparators 95-99, and the decoder drive circuitry 30 so that a cycle of operation may be resumed at exactly that point, so far as the position of the grinding wheel support 12 is concerned, which existed at the moment of power failure or power shut-off.

It is to be understood that although the invention has been specifically described in conjunction with a grinding wheel and grinding wheel support for a grinding machine, the invention is not so limited. The invention may be used with other types of machine tools as well. While the particular cycle of operation discussed, included three dwell periods, five different grinding feed rates and a rapid approach feed, it will be appreciated that the number of grinding feed rates may be varied, and more or fewer dwell periods provided if desired. Further, in some applications, the dwell periods may be entirely eliminated. The sequence control counter 48, in a practical case, itself may be adjustable to add or subtract functions.

The use of binary coded decimal signal techniques are, as will be appreciated by those skilled in the machining art, preferred in many applications because an operator may readily set the various switches and visual indicators which are readily available to provide the decimal numerals in response to binary coded decimal signals. A good man-machine interface is thus provided.

While preferred embodiments of the invention have been shown for purposes of illustration, it is to be understood that various changes in the details of construction and arrangement of parts may be made without departing from the spirit and scope of the invention as defined in the appended claims.

What is claimed is:

1. In a machine tool,
   a. pulse responsive means for moving a machine element,
   b. means for supplying pulses to said pulse responsive means and including comparator means having a parallel-bit reference count input which is to be matched by the number of pulses supplied to said pulse responsive means, and
   c. counter means for counting pulses fed to said pulse responsive means and having a parallel-bit output which is volatile in the event of power failure or power shut-off,
   d. non-volatile memory means connected to the parallel-bit output of said counter means for storing said parallel-bit output thereof and having a parallel-bit output connected to said comparator means and to said counter means, whereby the volatile output of said counter means may be restored subsequent to periods of power failure or power shut-off.

2. Apparatus according to claim 1 including,
   a. a bed,
   b. a workpiece support on said bed having means for supporting a workpiece, and
   c. a grinding wheel support,
   d. said pulse responsive means comprising a pulse motor for providing relative movement between said workpiece support and said grinding wheel support, and
   e. said means for counting pulses being applied to said pulse motor, whereby the count of said means for counting pulses and thus signals representative of the amount of relative movement between said means for supporting a workpiece and said grinding wheel support may be stored during periods of power failure or power shut-off.

3. Apparatus according to claim 2 including a grinding wheel rotatably mounted on said grinding wheel support.

4. Apparatus according to claim 3, wherein said means for counting pulses include an up/down counter means comprising an adder/subtractor means and a non-volatile memory means, and means for up-dating content of said up/down counter means by adding data stored in said non-volatile memory means to incoming count pulses within said adder/subtractor means.

5. Apparatus according to claim 3 wherein said means for counting pulses comprise binary coded decimal counter means which includes said non-volatile memory means and adder/subtractor means.

6. Apparatus according to claim 5 wherein said binary coded decimal counting means comprise binary coded decimal up/down counting means.

7. Apparatus according to claim 3 wherein said means for counting pulses comprise binary counting means.

8. Apparatus according to claim 7 wherein said non-volatile memory means comprise magnetic core storage means.

9. Apparatus according to claim 2, wherein said means for counting pulses include an up/down counter means comprising an adder/subtractor means and a non-volatile memory means, and means for up-dating content of said up/down counter means by adding data stored in said non-volatile memory means to incoming count pulses within said adder/subtractor means.

10. Apparatus according to claim 2 wherein said means for counting pulses comprise binary coded decimal counting means which includes said non-volatile memory means and adder/subtractor means.

11. Apparatus according to claim 10 wherein said binary coded decimal counting means comprise binary coded decimal up/down counting means.

12. Apparatus according to claim 2 wherein said means for counting pulses comprise binary counting means.

13. Apparatus according to claim 12 wherein said non-volatile memory means comprise magnetic core storage means.

14. Apparatus according to claim 1, wherein said means for counting pulses include an up/down counter means comprising an adder/subtractor means and a non-volatile memory means, and means for up-dating content of said up/down counter means by adding data stored in said non-volatile memory means to incoming count pulses within said adder/subtractor means.

15. Apparatus according to claim 1 wherein said means for counting pulses comprise binary coded decimal counting means which includes said non-volatile memory means and adder/subtractor means.

16. Apparatus according to claim 15 wherein said binary coded decimal counting means comprise binary coded decimal up/down counting means.

17. Apparatus according to claim 15 wherein said non-volatile memory means comprises means for storing at least 20 bits.

18. Apparatus according to claim 17 wherein said non-volatile memory means comprise at least 20 magnetic core storage elements, each core element being adapted to store one bit.

19. Apparatus according to claim 1 wherein said means for counting pulses comprise binary counting means.

20. Apparatus according to claim 19 wherein said non-volatile memory means comprise magnetic core storage means.

* * * * *

UNITED STATES PATENT OFFICE
CERTIFICATE OF CORRECTION

Patent No. 3,691,357　　　　　　　　　　Dated September 12, 1972

Inventor(s) MICHAEL DAVID McINTOSH

It is certified that error appears in the above-identified patent and that said Letters Patent are hereby corrected as shown below:

On the Abstract page, read the assignee as -- Landis Tool Company, Waynesboro, Pennsylvania.

In the abstract, line 28, after "shut" insert --down-- same line, read "updown" as --up-down--. Column 8, line 56 read "member" as -- members --. Column 10, line 34, read "with" as -- within --. Column 11, line 17, after "illustrated" read --)--.

Signed and sealed this 1st day of January 1974.

(SEAL)
Attest:

EDWARD M. FLETCHER, JR.　　　　RENE D. TEGTMEYER
Attesting Officer　　　　　　　　Acting Commissioner of Patents